(12) United States Patent
Araki

(10) Patent No.: US 10,318,204 B2
(45) Date of Patent: Jun. 11, 2019

(54) INFORMATION PROCESSING DEVICE AND INFORMATION PROCESSING METHOD FOR WRITING PLURALITY OF FILES ON RECORDING MEDIUM

(71) Applicant: SONY CORPORATION, Tokyo (JP)

(72) Inventor: Takahiro Araki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 51 days.

(21) Appl. No.: 15/317,937

(22) PCT Filed: May 18, 2015

(86) PCT No.: PCT/JP2015/064182
§ 371 (c)(1),
(2) Date: Dec. 9, 2016

(87) PCT Pub. No.: WO2015/198752
PCT Pub. Date: Dec. 30, 2015

(65) Prior Publication Data
US 2017/0115926 A1 Apr. 27, 2017

(30) Foreign Application Priority Data

Jun. 27, 2014 (JP) .................... 2014-132485

(51) Int. Cl.
*G06F 3/06* (2006.01)
*G11B 20/10* (2006.01)
(Continued)

(52) U.S. Cl.
CPC .......... *G06F 3/0643* (2013.01); *G06F 3/0604* (2013.01); *G06F 3/0656* (2013.01);
(Continued)

(58) Field of Classification Search
CPC ............ G06F 3/00; G06F 3/06–3/0689; G06F 12/00–12/16; G06F 2212/00–2212/7211
See application file for complete search history.

(56) References Cited

U.S. PATENT DOCUMENTS 5,214,631 A * 5/1993 Maeda .................... G11B 19/04
369/124.06
5,325,347 A * 6/1994 Sako ................. G11B 20/00007
369/47.3
(Continued)

FOREIGN PATENT DOCUMENTS

CN 1181579 A 5/1998
JP 08-077728 A 3/1996
(Continued)

OTHER PUBLICATIONS

Machine translation of JP08077728A (Year: 1996).*
(Continued)

*Primary Examiner* — Daniel C. Chappell
(74) *Attorney, Agent, or Firm* — Chip Law Group

(57) ABSTRACT

A filer of an information processing device continuously copies plural files recorded on a hard disk drive on an optical disc of an optical disk drive. An optical disc file system driver regards storing in a buffer of the file to be recorded on the optical disc as recording on the optical disc of the file and generates virtual management information for the file. In addition, the optical disc file system driver performs burst recording on a recording medium of a predetermined amount of data for each time when the predetermined amount of data of the file is stored in a buffer. Further, the optical disc file system driver updates the virtual management information by using information including a recording position of the file in the optical disc and records the (Continued)

virtual management information on the optical disc after completion of recording of the file on the optical disc.

9 Claims, 9 Drawing Sheets

(51) Int. Cl.
  *G11B 20/12*    (2006.01)
  *G11B 27/031*    (2006.01)
(52) U.S. Cl.
  CPC .......... *G06F 3/0667* (2013.01); *G06F 3/0677* (2013.01); *G11B 20/10527* (2013.01); *G11B 20/1217* (2013.01); *G11B 27/031* (2013.01)

(56) References Cited

U.S. PATENT DOCUMENTS

| | | | | |
|---|---|---|---|---|
| 5,436,875 A | * | 7/1995 | Shinada | G01C 21/26 369/30.23 |
| 5,671,204 A | * | 9/1997 | Yokouchi | G11B 19/02 369/47.33 |
| 5,680,379 A | * | 10/1997 | Ishida | G11B 19/02 369/47.33 |
| 6,134,626 A | | 10/2000 | Inokuchi et al. | |
| 6,272,589 B1 | * | 8/2001 | Aoki | G06F 3/0607 710/56 |
| 6,711,644 B1 | * | 3/2004 | Accapadi | G06F 13/12 710/263 |
| 7,068,575 B2 | * | 6/2006 | Gabryjelski | G11B 20/10527 369/47.33 |
| 8,670,205 B1 | * | 3/2014 | Malina | G06F 3/0625 360/69 |
| 9,699,263 B1 | * | 7/2017 | Shats | H04L 67/2852 |
| 10,146,481 B2 | * | 12/2018 | Ito | G06F 3/0676 |
| 2004/0054858 A1 | * | 3/2004 | Chandrasekaran | G06F 3/0608 711/154 |
| 2015/0149743 A1 | * | 5/2015 | Lu | G06F 12/1027 711/207 |
| 2016/0085574 A1 | * | 3/2016 | Dornemann | G06F 3/0664 718/1 |

FOREIGN PATENT DOCUMENTS

| | | | | | |
|---|---|---|---|---|---|
| JP | 08077728 A | * | 3/1996 | | |
| JP | 10-027321 A | | 1/1998 | | |
| JP | 10027321 A | * | 1/1998 | | |
| JP | 10-133931 A | | 5/1998 | | |
| JP | 10133931 A | * | 5/1998 | ....... | G11B 11/10504 |
| JP | 2001-084690 A | | 3/2001 | | |
| JP | 2001084690 A | * | 3/2001 | | |
| JP | 2005-235323 | | 9/2005 | | |
| JP | 2008-123363 A | | 5/2008 | | |
| JP | 2008123363 A | * | 5/2008 | | |
| JP | 2010-027145 A | | 2/2010 | | |
| JP | 2010-277649 A | | 12/2010 | | |
| MY | 126387 A | | 9/2006 | | |
| TW | 411452 B | | 11/2000 | | |

OTHER PUBLICATIONS

Machine translation of JP10027321A (Year: 1998).*
Machine translation of JP10133931A (Year: 1998).*
Machine translation of JP2001084690A (Year: 2001).*
Machine translation of JP2008123363A (Year: 2008).*
Dynamic Power Management With Optimal Time-Out Policies; Okamura et al.; IEEE Systems Journal, vol. 11, iss. 2, pp. 962-972; Jun. 2017 (Year: 2017).*
I/O Performance Optimization Techniques for Hybrid Hard Disk-Based Mobile Consumer Devices; Kim et al.; IEEE Transactions on Consumer Electronics, vol. 53, iss. 4, pp. 1469-1476; Nov. 2007 (Year: 2007).*
International Search Report and Written Opinion of PCT Application No. PCT/JP2015/064182, dated Aug. 11, 2015, 7 pages of English Translation and 7 pages of ISRWO.
International Preliminary Report on Patentability of PCT Application No. PCT/JP2015/064182, dated Dec. 27, 2016, pp. 5.

* cited by examiner

INFORMATION PROCESSING DEVICE AND INFORMATION PROCESSING METHOD FOR WRITING PLURALITY OF FILES ON RECORDING MEDIUM

CROSS REFERENCE TO RELATED APPLICATIONS

This application is a U.S. National Phase of International Patent Application No. PCT/JP2015/064182 filed on May 18, 2015, which claims priority benefit of Japanese Patent Application No. JP 2014-132485 filed in the Japan Patent Office on Jun. 27, 2014. Each of the above-referenced applications is hereby incorporated herein by reference in its entirety.

TECHNICAL FIELD

The present technology relates to an information processing device, information processing method and program, and makes it possible to complete writing of plural files on a recording medium at high speed.

BACKGROUND ART

Conventionally, as a file recording method for an optical disc, a live file system method, a master method, or the like has been used.

The live file system method is a method capable of writing file data on the optical disc on a file-by-file basis, and recording of the file data is immediately started to a file recording request, and file system information is recorded on the optical disc at the same time as completion of the recording. In addition, the live file system method is able to delete or move a file recorded, or to change a file name, and has excellent usability.

In the master method, since a continuous image in which files of small data size are collected is recorded on the optical disc at once, it is possible to perform burst recording, so that a decrease of a recording rate can be prevented when multiple files of small file size are copied at once.

In addition, in a file recording method disclosed in Patent Document 1, it has been performed that a dummy file is recorded on a disc once to suppress fragmentation of a file.

CITATION LIST

Patent Document

Patent Document 1: Japanese Patent Application Laid-Open No. 2010-27145

SUMMARY OF THE INVENTION

Problems to be Solved by the Invention

By the way, in the live file system method, it is necessary to record file system information for each file when multiple files of small file size are copied at once. In addition, in a case in which a file size is less than an amount of data of burst recording (hereinafter referred to as "burst recording amount") that makes a recording rate optimal, it is difficult to perform burst recording, and a transfer rate is decreased.

In the master method, problems are caused in usability; for example, delete or move, change of the file name cannot be performed of some files from plural files once recorded.

Further, in the file recording method disclosed in Patent Document 1, since the dummy file and dummy data are actually recorded on the disc during data recording, when multiple files of small size are continuously recorded, recording occurs twice and the transfer rate is decreased.

Therefore, the present technology aims to provide an information processing device, information processing method and program capable of completing continuous writing of plural files on a recording medium at high speed.

Solutions to Problems

A first aspect of the present technology is an information processing device including a recording control unit, wherein the recording control unit regards storing in a buffer of a file to be recorded on a recording medium as recording on the recording medium of the file and generates virtual management information for the file, and performs burst recording on the recording medium of a predetermined amount of data for each time when the predetermined amount of data of the file is stored in the buffer, and updates the virtual management information by using information including a recording position of the file in the recording medium and records the virtual management information on the recording medium after completion of recording of the file on the recording medium.

In the present technology, the information processing device includes, for example, a device driver for controlling a device that uses the recording medium, and a file system driver for controlling a file system. The file system driver generates the virtual management information as management information generated in accordance with an instruction from an application that performs file operation. The file system driver regards storing in the buffer of the file to be recorded on the recording medium as recording on the recording medium of the file, and generates management information that does not have information indicating the recording position of the file in the recording medium as the virtual management information on a memory. The file system driver, by generating the virtual management information in this way, causes the application to determine completion of recording of the file on the recording medium in accordance with completion of storing in the buffer even before completion of recording on the recording medium of the file. Further, the file system driver performs processing for performing burst recording on the recording medium of the predetermined amount of data for each time when the predetermined amount of data of the file is stored in the buffer, or processing for updating the virtual management information on the memory by using information indicating the recording position of the file in the recording medium and recording the virtual management information on the recording medium after completion of recording of the file on the recording medium. In addition, the file system driver, in a case in which there is no writing instruction of the file even after a lapse of a predetermined time, performs processing for recording data on the recording medium, in which the data is of less than the predetermined amount, not recorded on the recording medium, and stored in the buffer. In addition, to the file to be recorded in the recording medium, processing for recording on the recording medium through the buffer and processing for recording on the recording medium without going through the buffer are selectively performed on the basis of an instruction of a user. Recording of the file on the recording medium is performed by using a plurality of channels of recording heads, and the file system driver stores the data of the file in the buffer provided for each of the channels.

A second aspect of the present technology is an information processing method including:

regarding storing in a buffer of a file to be recorded on a recording medium as recording on the recording medium of the file and generating virtual management information for the file, with a recording control unit;

performing burst recording on the recording medium of a predetermined amount of data for each time when the predetermined amount of data of the file is stored in the buffer, with the recording control unit; and updating the virtual management information by using information including a recording position of the file in the recording medium and recording the virtual management information on the recording medium after completion of recording of the file on the recording medium, with the recording control unit.

A third aspect of the present technology is a program that causes a computer to execute processing for recording a plurality of files continuously on a recording medium, the program causing the computer to execute:

regarding storing in a buffer of a file to be recorded on a recording medium as recording on the recording medium of the file and generating virtual management information for the file;

performing burst recording on the recording medium of a predetermined amount of data for each time when the predetermined amount of data of the file is stored in the buffer; and updating the virtual management information by using information including a recording position of the file in the recording medium and recording the virtual management information on the recording medium after completion of recording of the file on the recording medium.

Note that, the program of the present technology is, for example, a program that can be provided to a general-purpose computer capable of executing various programs and codes, by a storage medium, a communication medium to be provided in a computer readable form, for example, a storage medium such as an optical disc, a magnetic disk, or a semiconductor memory, or a communication medium such as a network. By providing such a program in a computer readable form, processing is implemented according to the program on the computer.

Effects of the Invention

With the present technology, storing in the buffer of the file to be recorded on the recording medium is regarded as recording on the recording medium of the file, and the virtual management information for the file is generated. In addition, burst recording on the recording medium of the predetermined amount of data is performed for each time when the predetermined amount of data of the file is stored in the buffer. Further, the virtual management information is updated by using the information including the recording position of the file in the recording medium and is recorded in the recording medium after completion of recording of the file on the recording medium. Therefore, continuous writing of the plural files on the recording medium can be completed at high speed. Note that, the advantageous effects described in this specification are merely examples, and the advantageous effects of the present technology are not limited to them and may include additional effects.

MODES FOR CARRYING OUT THE INVENTION

The following is a description of embodiments for carrying out the present technology. Note that, explanation will be made in the following order.

1. Configuration of Recording System
2. Operation of Information Processing Device
<1. Configuration of Recording System>

Figure 1:
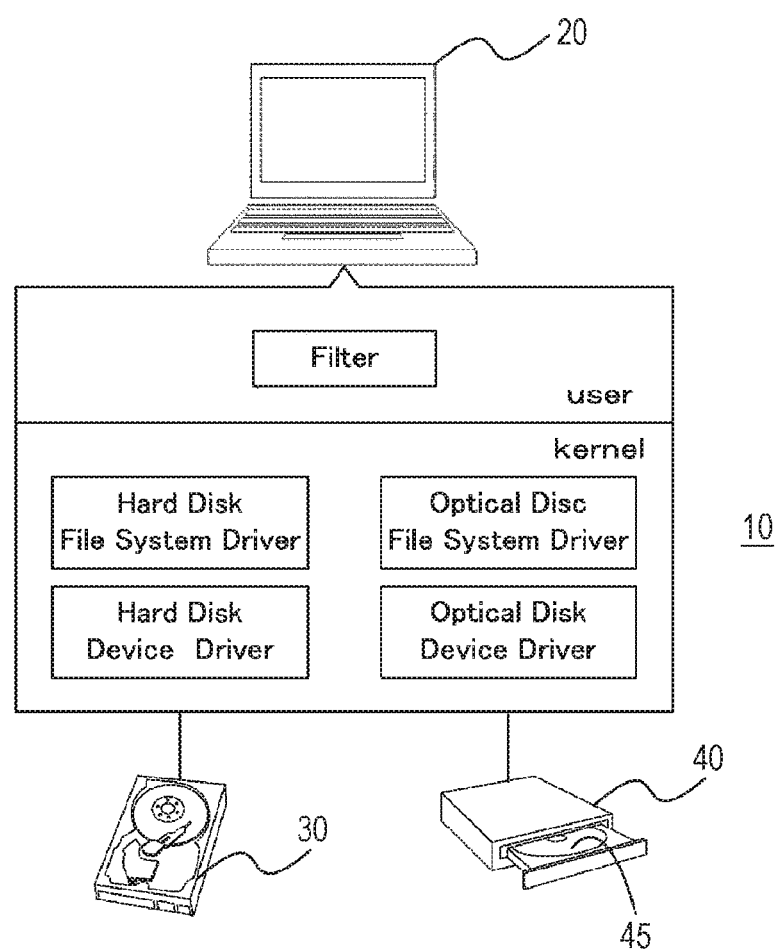
FIG. 1 is a diagram illustrating a configuration of a recording system.

FIG. 1 illustrates a configuration of a recording system using an information processing device of the present technology. In a recording system 10, an information processing device 20 is connected to, for example, a hard disk drive 30 and an optical disk drive 40. The information processing device 20 and the hard disk drive 30 are connected together with a predetermined interface standard, and the information processing device 20 and the optical disk drive 40 are connected together with a predetermined interface standard.

Software that configures an operating system operating in the information processing device 20 is divided into a user mode layer and a kernel mode layer. The user mode layer is provided with application software, for example, a filer for performing file operation. In addition, the kernel mode layer is provided with a hard disk device driver, an optical disk device driver, a hard disk file system driver, and an optical disc system driver. Note that, software illustrated in FIG. 1 is a part of the operating system, and the user mode layer and the kernel mode layer are provided with software required for performing various types of operation.

The filer is application software operating in a user mode, and is software for browsing, copying, deleting, or moving a file. The filer is, for example, Explorer that is provided in Windows (registered trademark) operating system provided by Microsoft Corporation, Finder that is provided in Mac OS (registered trademark) provided by Apple Computer, Inc., or the like.

The hard disk device driver and the optical disk device driver are storage class drivers. The hard disk device driver abstracts recording/reproducing to/from the hard disk drive, and the optical disk device driver abstracts recording/reproducing to/from the optical disk drive. In this way, the device driver absorbs a difference depending on a particular device by abstracting recording/reproducing to/from the drive, and provides to upper level software an interface that does not depend on the device.

The hard disk file system driver and the optical disc file system driver abstract file access from the filer operating in the user mode, and replace the file access with an interface of a lower level device driver. Therefore, in accordance with the file access from the filer, recording/reproducing of the file is possible with the hard disk drive 30 or the optical disk drive 40.

The hard disk file system driver is a file system driver for NTFS/FAT normally incorporated in the operating system. The hard disk file system driver performs processing for recording the file data and file system in the hard disk drive, and processing for reading the file data and file system recorded through the hard disk device driver.

The optical disc file system driver performs processing for recording on the optical disc the file data and file system in a predetermined file system format, for example, UDF, and processing for reading the file data and file system recorded through the optical disk device driver. Further, the information processing device 20 is provided with a memory, and the optical disc file system driver stores the file data read from a copy source in a buffer for a proxy file provided on the memory. In addition, the optical disc file system driver performs burst recording on the optical disc of the file data stored in the buffer. Further, the optical disc file system driver regards storing in the buffer of the file to be recorded on the optical disc as recording on the optical disc of the file, and makes it possible to start copy processing of the next file even before the file data is all recorded on the optical disc. Note that, since the file is additionally recorded in a case in which the optical disc is a write once type, regarding data of the file once recorded, the data recorded can be read when the same address of the optical disc is read, even if the file is deleted.

The hard disk drive 30 stores application software to be executed by the information processing device 20, and various files to be used in the application software.

Figure 2:
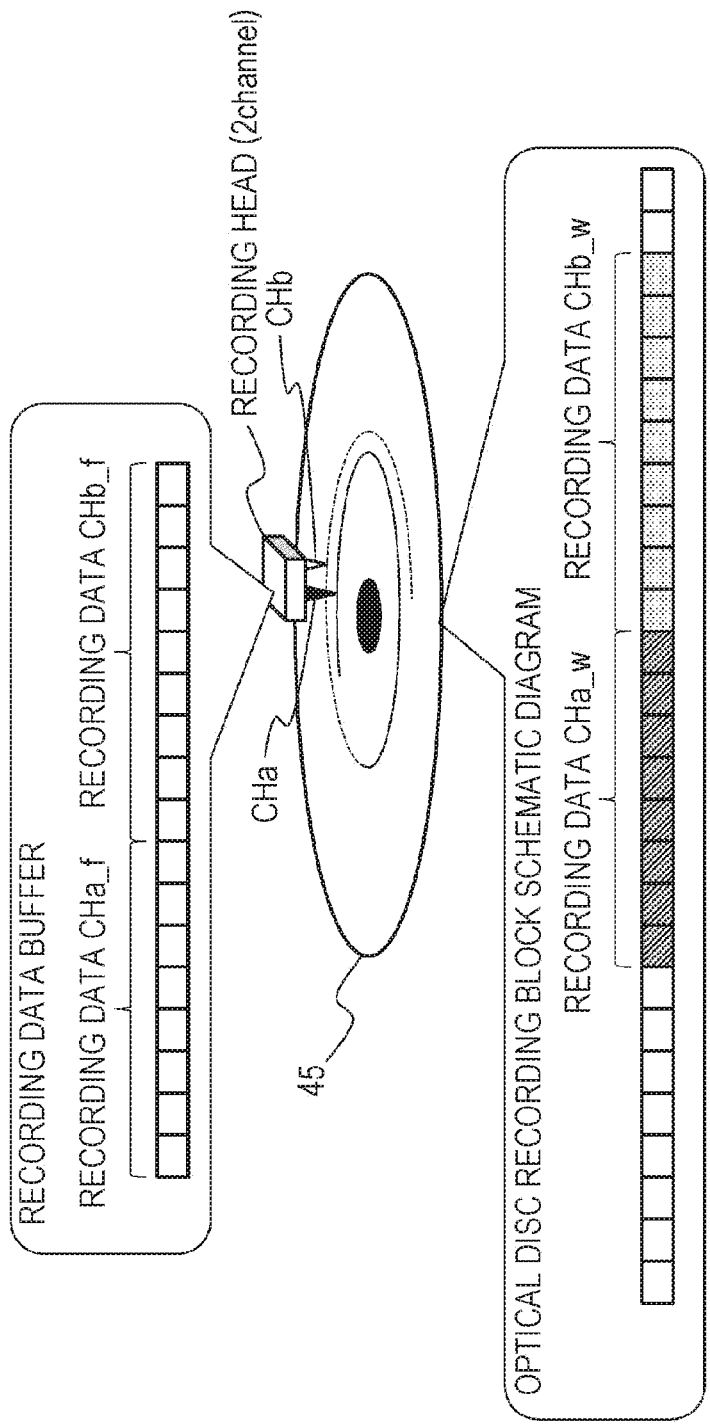
FIG. 2 is a diagram illustrating operation in a case in which two channels of recording beds are used in an optical disk drive.

The optical disk drive 40 is configured by using, for example, plural channels of optical heads, and performs recording at higher speed than that in a case in which one channel of optical head is used, by, for example, recording file data allocated for each channel by using the optical head of each channel. In addition, the optical disk drive 40 performs burst recording, and records the file data allocated for each channel on the optical disc at high speed. FIG. 2 illustrates operation in a case in which two channels of recording beds are used in the optical disk drive. File data to be recorded in an optical disc 45 is allocated to recording data CHa_f and recording data CHb_f each of which is a burst recording amount. Burst recording to the optical disc 45 is performed of the recording data CHa_f through a channel CHa of the recording head, and of the recording data CHb_f through a channel CHb, and the optical disc 45 is in a state in which recording data CHa_w and recording data CHb_w are continuously recorded.

<2. Operation of Information Processing Device>

Next, as operation of the information processing device, operation of the filer and the file system driver is described in a case in which plural files are continuously copied on the optical disc.

In the information processing device, the file data read from the copy source is stored in the buffer for the proxy file provided on the memory. In addition, the information processing device, in a case in which an amount of data of the file data stored is the burst recording amount, records the file data stored in the buffer for the proxy file on the optical disc. Further, the information processing device, in a case in which file data of all files to be copied has been completed before the amount of data of the file data stored is the burst recording amount, records on the optical disc the file data stored in the buffer for the proxy file.

Note that, in the following description, it is assumed that Windows (registered trademark) operating system provided by Microsoft Corporation is used in the information processing device.

The filer performs processing for selecting plural files recorded on a copy source, for example, the hard disk drive 30, and continuously copying the plural files on the optical disc 45 that is a copy destination. The filer, after completion of copying of one file, starts copying of the next file and successively copies the files from the hard disk drive 30 to the optical disc 45 in the optical disk drive 40. In addition, after completion of copying of one file, setting of the same file attribute as that of the copy source file, or the like is performed for the copy destination file. Note that, in the file attribute, for example, information relating to an application by which the file is created, creation date and time or update date and time of the file, information whether or not it is read-only are indicated.

Figure 3:
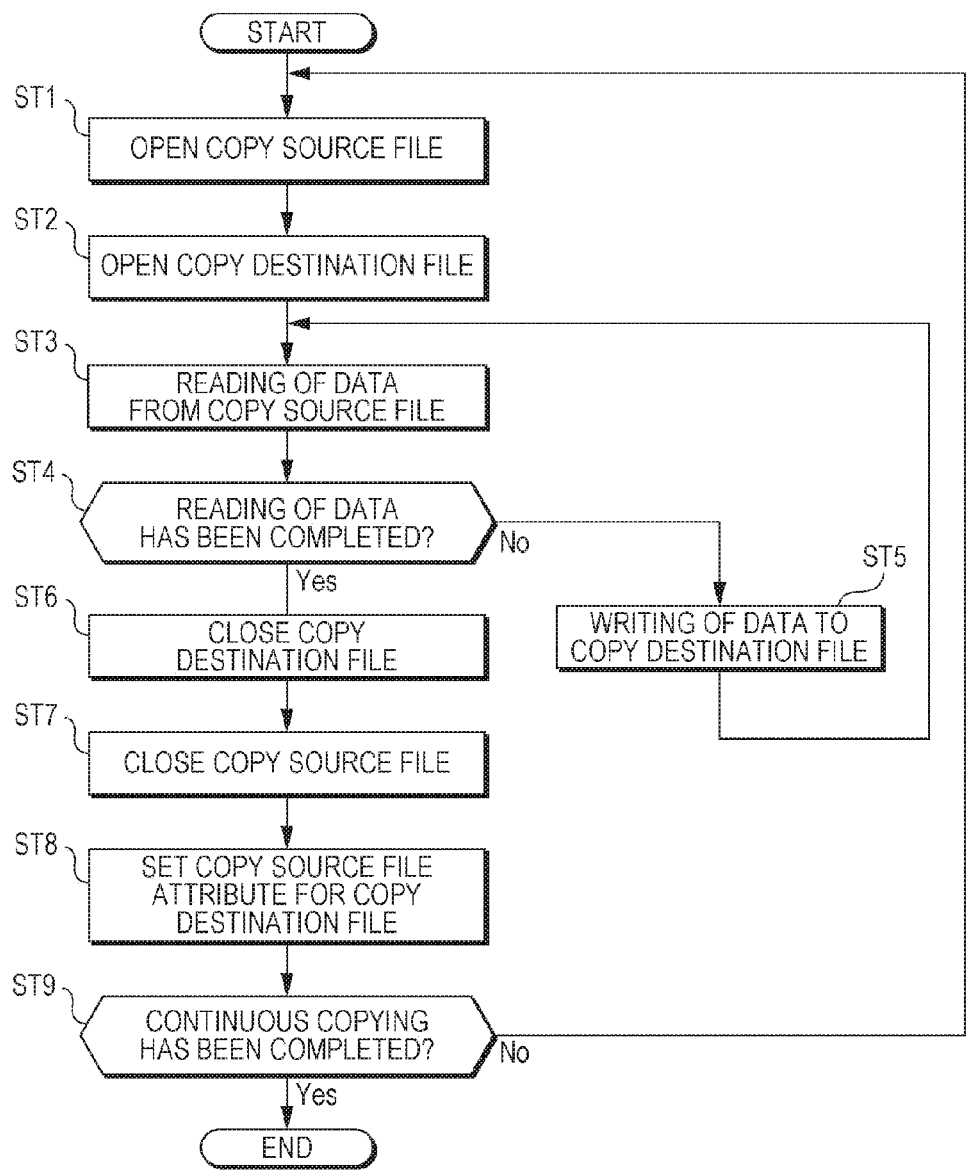
FIG. 3 is a flowchart illustrating operation of a filer in continuous copying of plural files.

FIG. 3 is a flowchart illustrating operation of the filer in continuous copying of the plural files. In step ST1, the filer opens the copy source file. The filer sends CreateFile( ) function in which a file name of the copy source, handling of the file, and the like are indicated, to the hard disk file system driver, and proceeds to step ST2. Here, the filer, from the fact that the file of the copy source exists, sets a value of a parameter dwCreationDisposition for specifying handling of the file in the CreateFile( ) function to "OPEN_EXISTIN."

In step ST2, the filer opens the copy destination file. The filer sends CreateFile( ) function in which a file name of the copy destination file, handling of the file, and the like are indicated, to the optical disc file system driver, and proceeds to step ST3. Here, the filer, in a case in which a copy destination file is newly created, sets the value of the parameter dwCreationDisposition for specifying handling of the file in the CreateFile( ) function to "CREATE_NEW."

In step ST3, the filer reads the data from the copy source file. The filer sends ReadFile( ) function in which handle of the file of the copy source, the number of bytes to be read, a pointer indicating a storing position of the data read, and the like are indicated, to the hard disk file system driver, and proceeds to step ST4.

In step ST4, the filer determines whether or not reading of the data has been completed. The filer, on the basis of a return value to the ReadFile( ) function from the hard disk file system driver, determines whether or not data reading of the file of the copy source has been completed. The filer proceeds to step ST5 when having determined that reading of the data has not been completed, and proceeds to step ST6 when having determined that reading of the data has been completed.

In step ST5, the filer writes the data to the copy destination file. The filer sends WriteFile( ) function in which handle of the copy destination file, the number of bytes to be written that is equal to the above-described number of bytes to be read, a pointer indicating a storing position of the data to be written, and the like are indicated, to the optical disc file system driver, and returns to step ST3.

That is, the filer, by repeating the processing from step ST3 to step ST5, writes the data of the copy source file to the copy destination file sequentially in a unit of the number of bytes to be read (=to be written). After that, when the data of the copy source file is all written to the copy destination file, the filer performs processing of step ST6.

In step ST6, the filer closes the copy destination file. The filer sends CloseHandle( ) function in which handle of the copy destination file is indicated, to the optical disc file system driver, and proceeds to step ST7.

In step ST7, the filer closes the copy source file. The filer sends CloseHandle( ) function in which handle of the file of the copy source is indicated, to the hard disk file system driver, and proceeds to step ST8.

In step ST8, the filer sets a copy source file attribute for the copy destination file. The filer sets the same file attribute as that of the copy source file for the copy destination file, and proceeds to step ST9.

In step ST9, the filer determines whether or not it is completion of the continuous copying. The filer, when having determined that there is a file that has not been copied, sets the file that has not been copied as the next copy source file, and returns to step ST1. In addition, the filer, when having determined that copying has been completed for all files to be copied, ends the processing of continuous copying.

Figure 4:
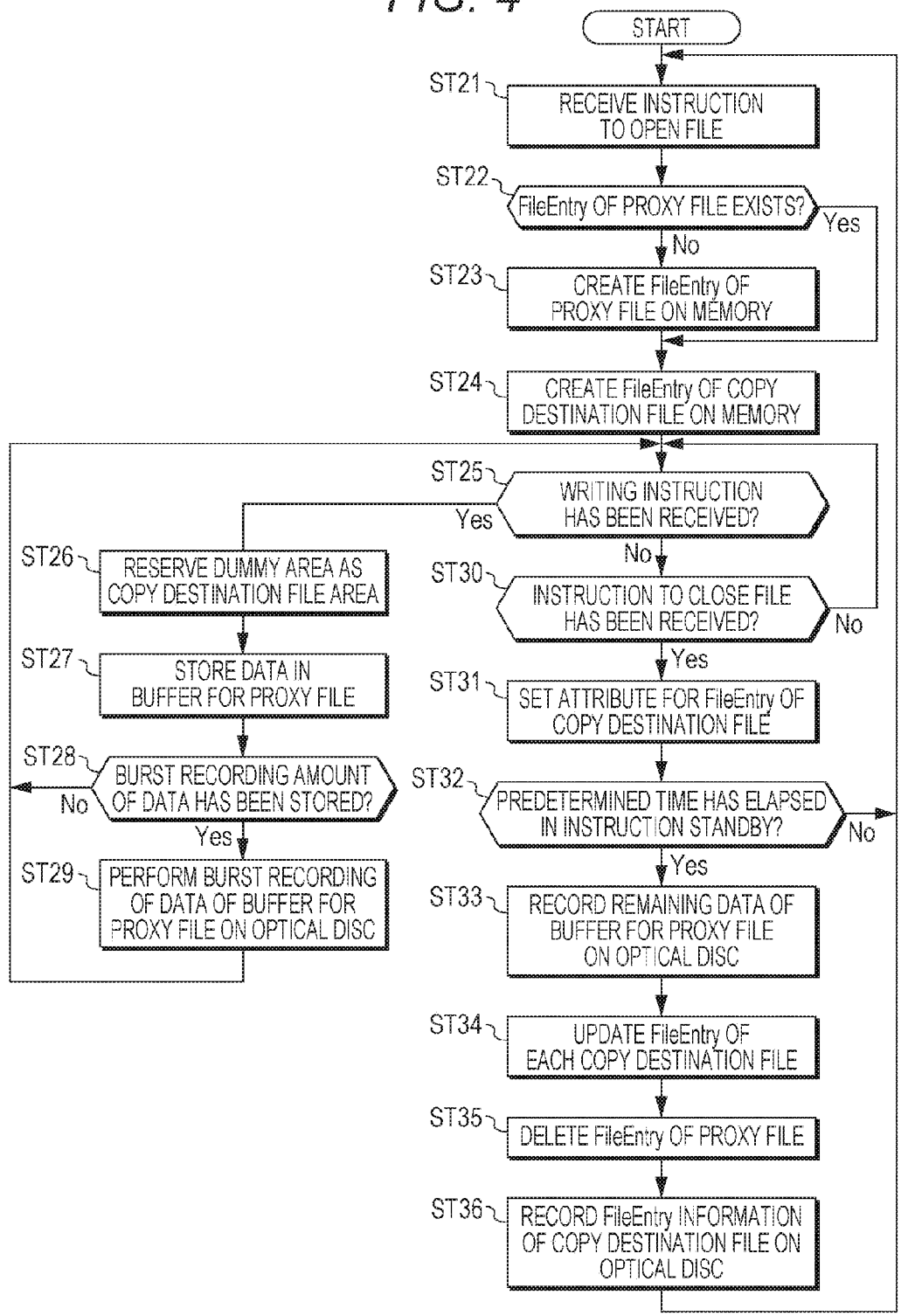
FIG. 4 is a flowchart illustrating operation of an optical disc file system driver in the continuous copying of the plural files.

FIG. 4 is a flowchart illustrating operation of the optical disc file system driver in the continuous copying of the plural files.

The optical disc file system driver (hereinafter, simply referred to as "file system driver") regards storing in the buffer of the file to be recorded on the optical disc as recording on the optical disc of the file, and generates virtual management information for the file on the memory. In addition, the file system driver performs burst recording on the optical disc of a burst recording amount of file data for each time when the burst recording amount of file data is stored in the buffer. Further, the file system driver updates the virtual management information on the memory by using information including a recording position of the file in the optical disc and records the virtual management information on the optical disc after completion of recording of the plural files on the optical disc.

In step ST21, the file system driver receives an instruction to open the file. The file system driver receives the CreateFile( ) function sent from the filer in step ST2 of FIG. 3, and proceeds to step ST22.

In step ST22, the file system driver determines whether or not a file entry (FileEntry) of a proxy file exists. The file entry of the proxy file is information indicating an area position and area size of the proxy file, and the file system driver proceeds to step ST23 in a case in which the file entry does not exist on the memory, and proceeds to step ST24 in a case in which the file entry exists.

In step ST23, the file system driver creates the file entry of the proxy file on the memory. The file system driver makes it possible that the file data read from the copy source file is written to the buffer for the proxy file by creating the file entry of the proxy file, and proceeds to step ST24.

In step ST24, the file system driver creates a virtual file entry of the copy destination file on the memory. The file system driver, as described above, stores the file data of the file to be copied in the buffer for the proxy file provided on the memory, and performs burst recording on the optical disc of the file data stored. Therefore, even when the filer instructs writing of the file, the file is not recorded on the optical disc until the file data is of the burst recording amount. For this reason, the file system driver creates the virtual file entry, and the virtual file entry is a file entry not indicating actual recording information (recording area size and recording position on the optical disc) of the file. Note that, information of the virtual file entry corresponds to the above-described virtual management information. The file system driver creates the virtual file entry, and proceeds to step ST25.

In step ST25, the file system driver determines whether or not a writing instruction has been received. The file system driver proceeds to step ST26 when having received the WriteFile( ) function sent from the filer in step ST5 of FIG. 3, and proceeds to step ST30 when not having received.

In step ST26, the file system driver reserves a dummy area as a copy destination file area. The file system driver makes an area be the dummy area of the number of bytes to be written indicated by the WriteFile( ) function, and reserves the dummy area as the copy destination file area, and proceeds to step ST27.

In step ST27, the file system driver stores the data in the buffer for the proxy file. The file system driver stores the file data to be written indicated by the WriteFile( ) function for the proxy file in the buffer provided on the memory, and proceeds to step ST28.

In step ST28, the file system driver determines whether or not the burst recording amount of data has been stored. The file system driver proceeds to step ST29 in a case in which the file data stored in the buffer is of the burst recording amount. In addition, the file system driver returns to step ST25 in a case in which the file data stored in the buffer is of less than the burst recording amount.

In step ST29, the file system driver performs burst recording on the optical disc of the data stored in the buffer for the proxy file. In addition, the file system driver makes an area of the data be a free area in which recording has been completed in the buffer for the proxy file so that new data can be written, and returns to step ST25.

When proceeding from step ST25 to step ST30, in step ST30, the file system driver determines whether or not an instruction to close the file has been received. The file system driver proceeds to step ST31 when having received the CloseHandle( ) function sent from the filer in step ST6 of FIG. 3, and returns to step ST25 when not having received the CloseHandle( ) function.

In step ST31, the file system driver sets an attribute for the virtual file entry of the copy destination file. The file system driver determines that copying to the copy destination file has been completed from the fact that the instruction to close the copy destination file has been received, and sets the attribute for the virtual file entry of the copy destination file by using the attribute information of the copy source file, and proceeds to step ST32.

In step ST32, the file system driver determines whether or not a predetermined time has elapsed in an instruction standby. In the information processing device 20, the predetermined time has been set in advance for determining an end of the continuous copying of the plural files. The file system driver returns to step ST21 in a case in which there is an instruction to open the file from the filer before the lapse of the predetermined time (for example, five seconds), and receives the instruction to open the file, and performs copy processing of the next file. In addition, the file system driver proceeds to step ST33 in a case in which there is no instruction to open the file from the filer even after the lapse of the predetermined time.

In step ST33, the file system driver records remaining data of the buffer for the proxy file on the optical disc. The file system driver records on the optical disc the remaining data of the buffer for the proxy file, that is, the file data that is of less than the burst recording amount and has not been recorded on the optical disc yet, and proceeds to step ST34.

In step ST34, the file system driver updates the file entry of each copy destination file. The file system driver, from the fact that the files to be copied has all been recorded on the optical disc by performing processing up to step ST33, updates the virtual file entry by using the information including the recording position of the file in the optical disc. That is, the file system driver, for each copy destination file, by using the information including the area size that is a total value of the dummy areas allocated and the recording position of the file recorded on the optical disc through the buffer for the proxy file, updates the virtual file entry of each copy destination file created on the memory to a file entry indicating the actual recording information, and proceeds to step ST35.

In step ST35, the file system driver deletes the file entry of the proxy file. The file system driver, from the fact that the proxy file is not necessary since the processing has been completed for recording the file data of all files to be copied on the optical disc, deletes the file entry of the proxy file and proceeds to step ST36.

In step ST36, the file system driver records information of the file entry of the copy destination file on the optical disc. The file system driver records file system information on the optical disc, in which the file system information includes the information of the file entry after update and is created for each copy destination file on the memory, and returns to step ST21.

Figure 5:
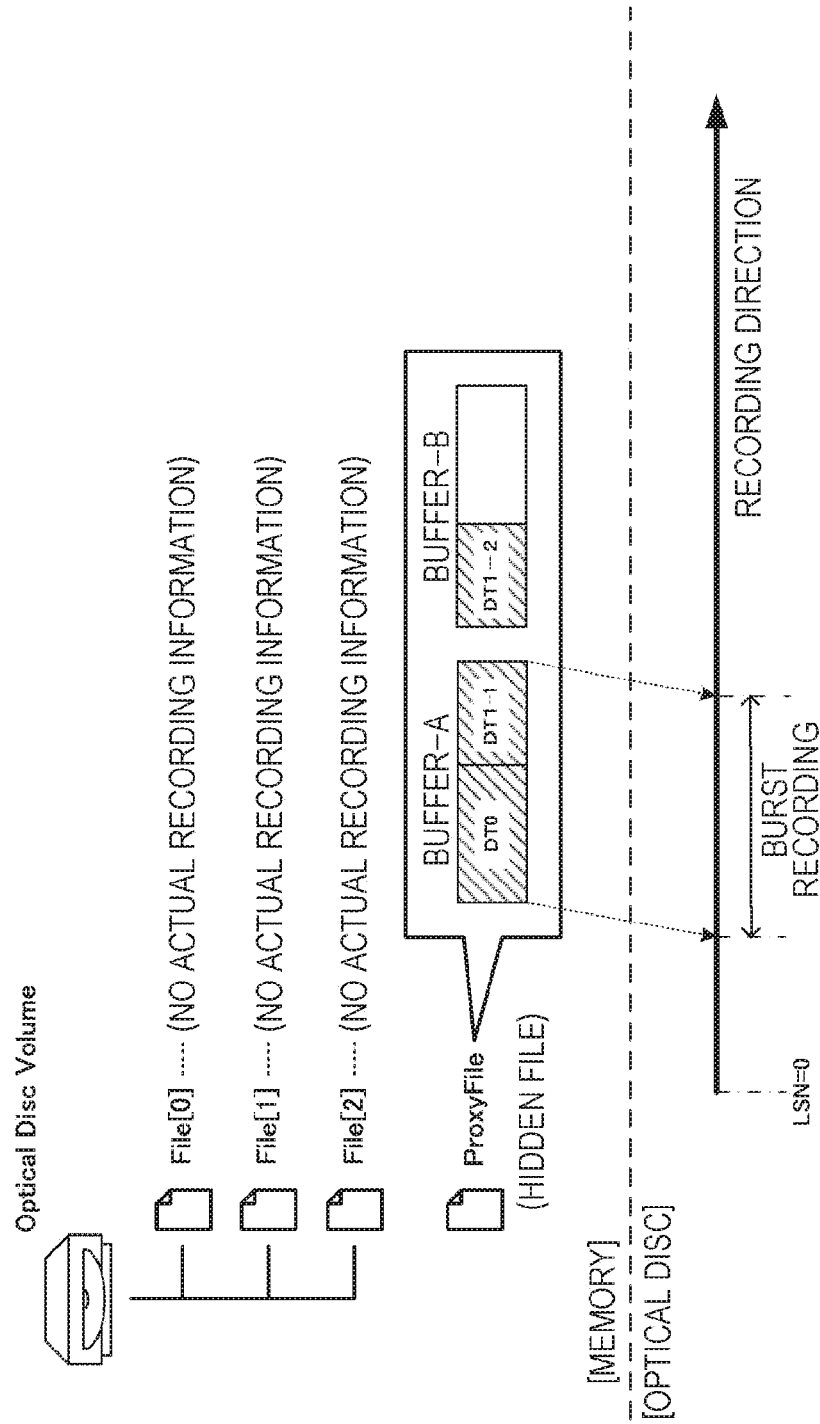
FIG. 5 is a diagram illustrating processing operation during continuous copying of file data.

FIG. 5 illustrates processing operation during continuous copying of the file data. Note that, in FIG. 5, the burst recording amount is, for example, 64 MB, and an amount of data of each of files of File[0]-File[2] is less than 64 MB, and a total amount of data of the files is 64 MB or more.

The filer, for the File[0]-File[2], performs copying from a hard disk volume to an optical disc volume. In addition, the file system driver sequentially stores the file data supplied by the WriteFile( ) function in the buffer for the proxy file, and makes it possible to record the file data on the optical disc for each burst recording amount. That is, the file system driver performs processing equivalent to processing for dividing connected data in which the file data of the File[0]-File[2] are connected together for each burst recording amount. The file system driver, for each time when the burst recording amount of file data is stored in the buffer for the proxy file, performs burst recording on the optical disc of the burst recording amount of file data.

The file system driver performs processing for creating the proxy file entry and the virtual file entry in which there is no actual recording information for the File[0]-File[2], and processing for storing the file data of the copy source file in the buffer for the proxy file on the basis of the writing instruction from the filer. Further, the file system driver performs processing for completing the virtual file entry on the basis of an attribute setting instruction sent from the filer after an end of the writing instruction, and the like. In addition, the filer performs existence check after completion of copying and setting of the file attribute for the virtual file entry, and then starts copying of the next file. Therefore, for example, even when processing has not been completed for recording data of the File[0] on the optical disc, copying can be started of the next data of the File[1]. Note that, in a case in which the data of the File[0] is read from the optical disc on the basis of the virtual file entry, data can be obtained that is filled with, for example, "0." Data comparison cannot be performed between a transfer source and a transfer destination at this time; however, the actual data is not read from the optical disc, so that degradation of transfer performance is not caused.

In addition, the proxy file is made to be a hidden file (for example, an internal system file), and the file system driver makes the proxy file unrecognizable from the filer and other applications. The buffer for the proxy file has, for example, a buffer-A corresponding to the channel CHa of the recording head, and a buffer-B corresponding to the channel CHb. The file system driver, when the burst recording amount of file data is stored in the buffer, performs burst recording on the optical disc of the file data stored in the buffer. Note that, FIG. 5 illustrates a case in which burst recording is performed on the optical disc of file data DT0 of the File[0] and file data DT1-1 of a part of the File[1] that are stored in the buffer-A by using the channel CHa of the recording head. In addition, although it is not illustrated, in a case in which the burst recording amount of file data is stored in the buffer-B during burst recording of the file data stored in the buffer-A, the file system driver performs burst recording of the file data stored in the buffer-B in parallel. In addition, the file system driver may perform burst recording when the burst recording amount of file data is stored in the buffer-A and the buffer-B. Further, the file system driver sets a buffer capacity and deletes the data having recorded on the optical disc so that new file data can be stored in the buffer even during burst recording. In this way, the file data stored can be recorded on the optical disc while the file data is stored in the buffer, and the plural files can be recorded on the optical disc more efficiently.

Figure 6:
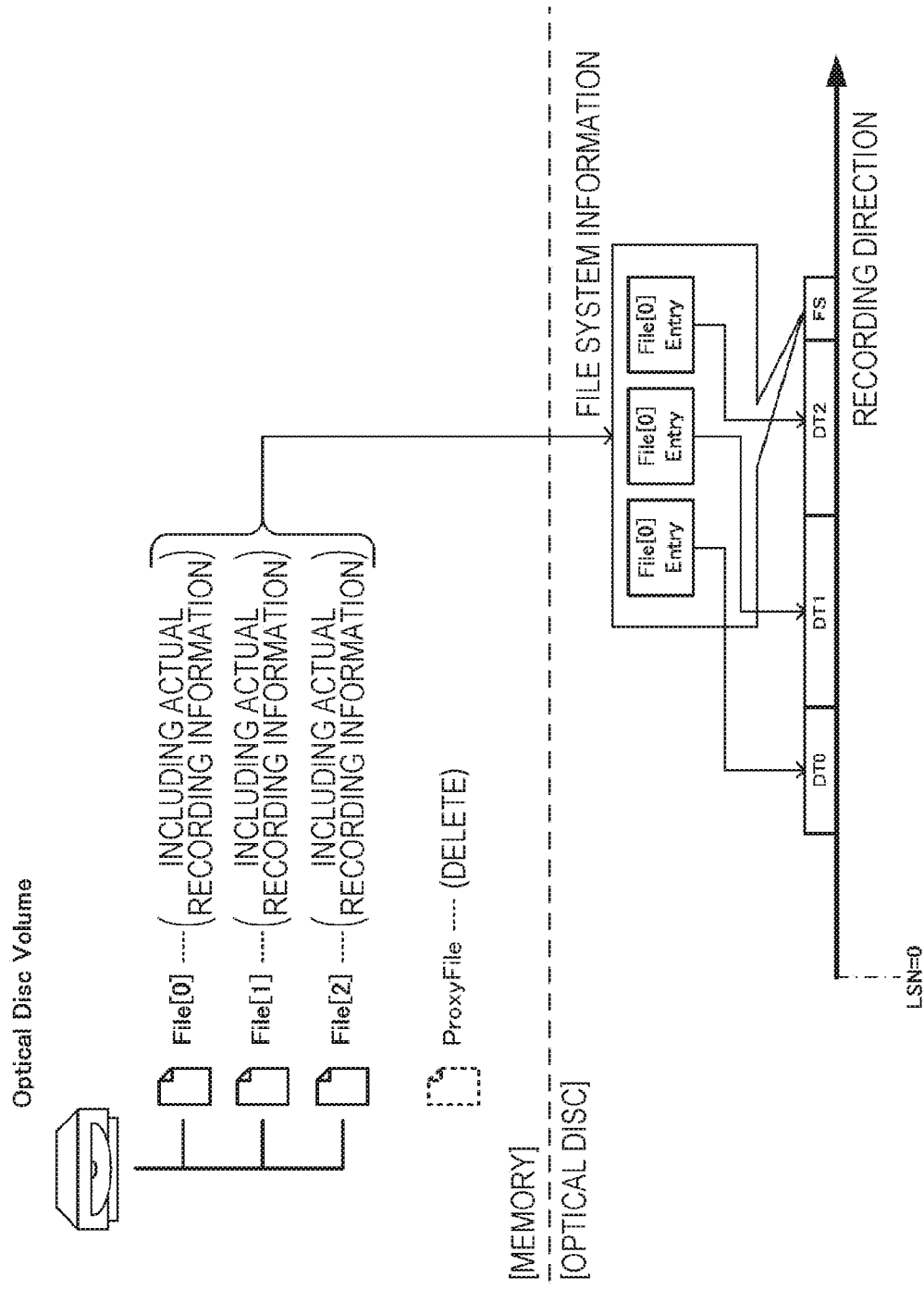
FIG. 6 is a diagram illustrating processing operation after completion of recording of the file data.

FIG. 6 illustrates processing operation after completion of recording of the file data. The file system driver, when determining that the predetermined time has elapsed in step ST32 of FIG. 4, records the remaining data of the buffer for the proxy file on the optical disc in step ST33. Therefore, on the optical disc, recording is completed of the file data DT0 of the File[0], file data DT1 of the File[1], and file data DT2 of the File[2]. After that, the file system driver updates the virtual file entry of each file to the file entry indicating the actual recording information by allocating a record area in the optical disc of the file data for the File[0]-File[2]. In addition, the file system driver deletes the file entry of the proxy file that is no longer needed. Further, the file system driver records on the optical disc the file system information including the file entries after update of the File[0]-File[2]. The file system driver, by performing the processing described above, is able to record on the optical disc the file data of the File[0]-File[2] and the file system information relating to the File[0]-File[2].

Figure 7:
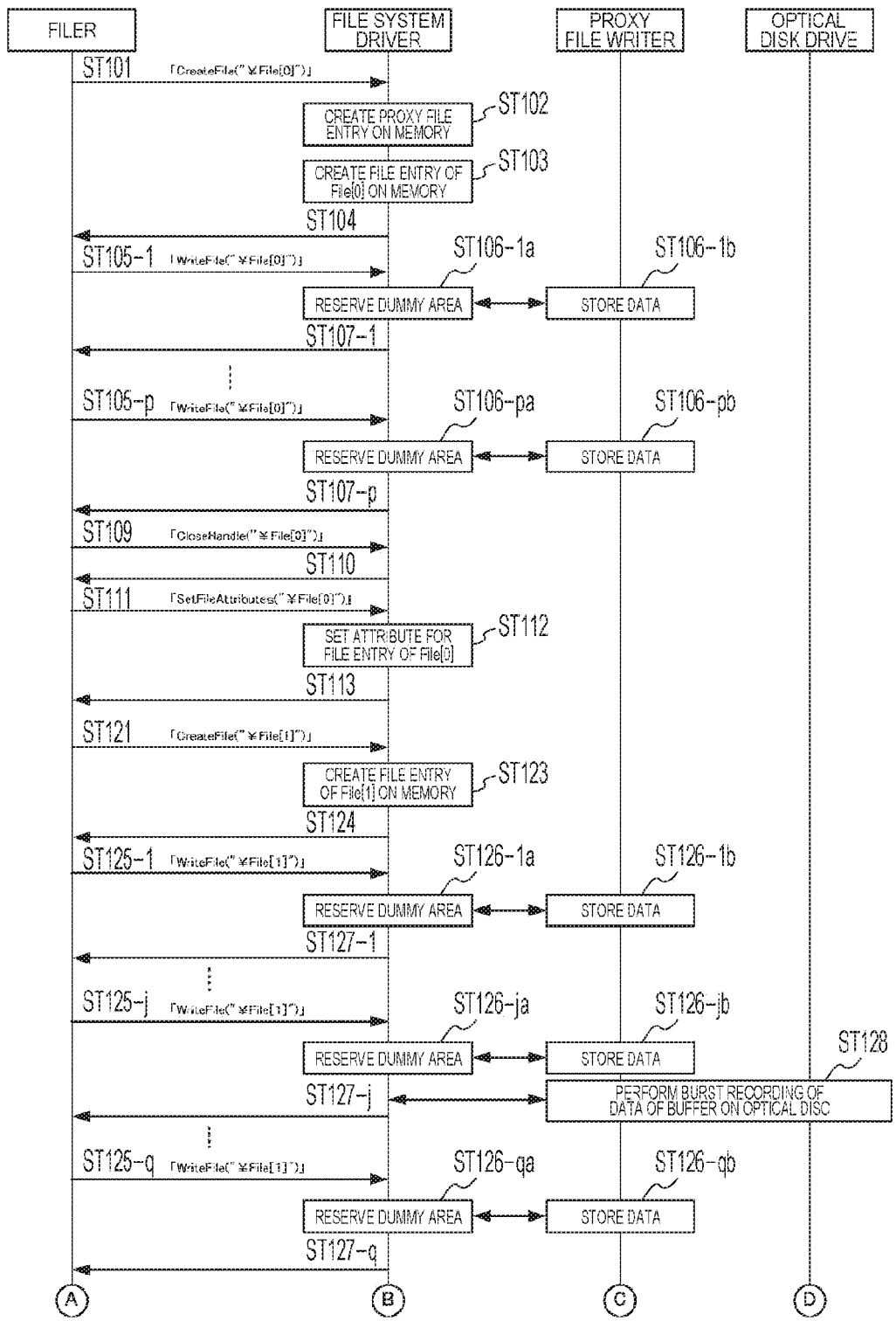
FIG. 7 illustrates a sequence diagram (part 1) of the continuous copying of the plural files.
Figure 8:
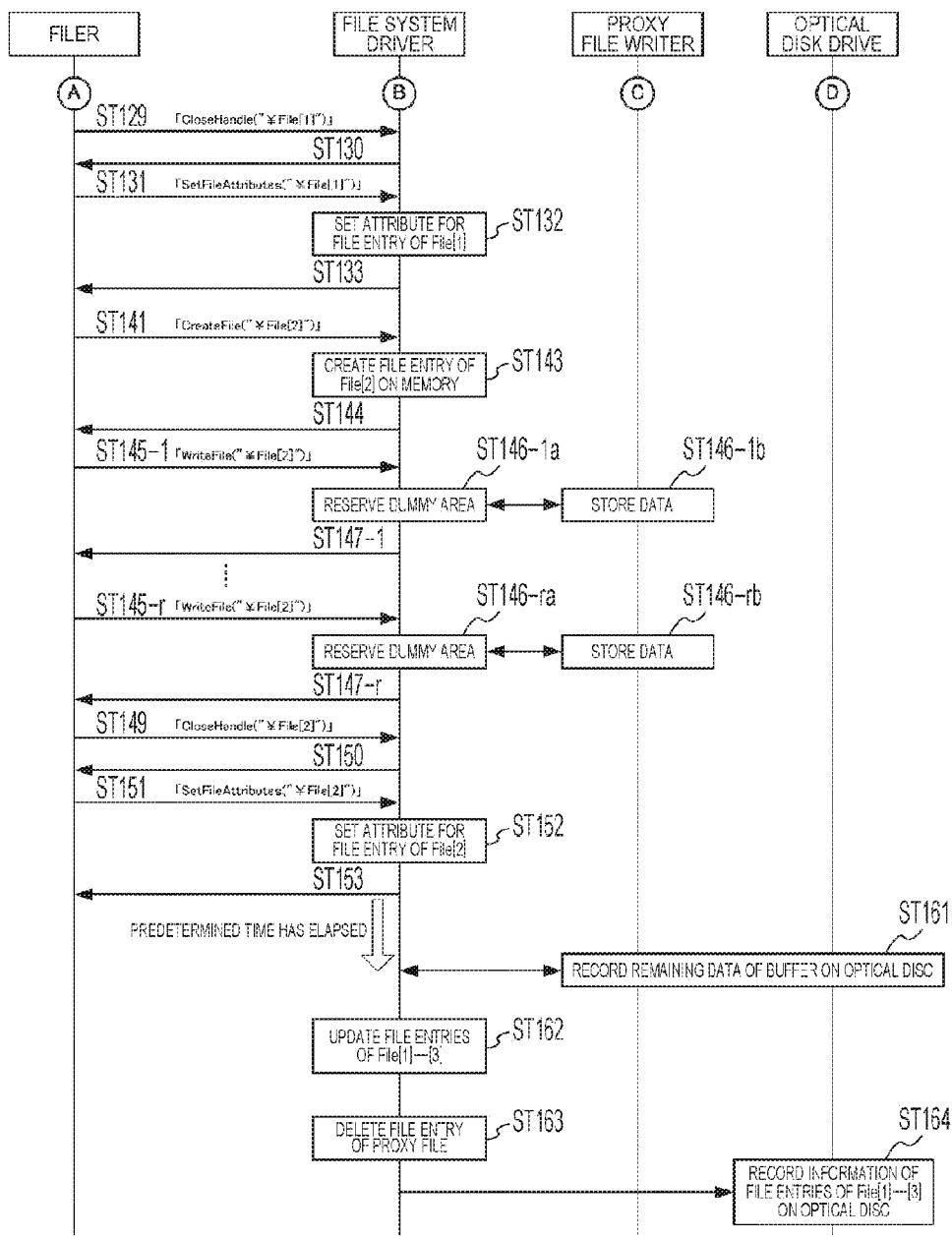
FIG. 8 illustrates a sequence diagram (part 2) of the continuous copying of the plural files.

FIG. 7 and FIG. 8 illustrate sequence diagrams of the continuous copying of the plural files. Note that, FIG. 7 and FIG. 8 illustrate a case in which the File[0]-File[2] are continuously copied as illustrated in FIG. 5 and FIG. 6. In addition, FIG. 7 and FIG. 8 illustrate a case in which the data of the buffer for the proxy file is sent to the optical disk drive by using a proxy file writer.

The filer starts copy processing of the File[0], and, in step ST101, sends CreateFile("¥File[0]") function that is an instruction to open the File[0] that is the copy destination file, to the file system driver.

In step ST102, the file system driver creates the proxy file entry on the memory. In step ST103, the file system driver creates the file entry of the File[0] on the memory as the virtual file entry, and, in step ST104, the file system driver sends to the filer a return value indicating that the File[0] is opened.

Next, from the fact that the File[0] is opened, in step ST105-1, the filer sends WriteFile("¥File[0]") function that is a writing instruction of the data to the copy destination file, to the file system driver.

On the basis of the writing instruction, in step ST106-1a, the file system driver reserves a dummy area of the number of bytes to be written indicated by the WriteFile("¥File[0]") function. In addition, the file system driver controls the proxy file writer on the basis of the writing instruction, and stores the file data of the number of bytes to be written in the buffer for the proxy file in step ST106-1b. In step ST107-1, the file system driver sends to the filer a return value indicating that processing of the writing instruction has been completed.

After that, the writing instruction and processing based on the writing instruction are repeatedly performed, and, in step ST105-p, the filer sends the WriteFile("¥File[0]") function to the file system driver to write the last file data of the File[0] to the copy destination file.

On the basis of the writing instruction, in step ST106-pa, the file system driver reserves the dummy area of the number of bytes to be written indicated by the WriteFile("¥File[0]") function. In addition, the file system driver controls the proxy file writer on the basis of the writing instruction, and stores the file data of the number of bytes to be written in the buffer for the proxy file in step ST106-pb. In step ST107-p, the file system driver sends to the filer a return value indicating that processing of the writing instruction has been completed.

In step ST109, the filer determines that it is completion of writing of all file data of the File[0], and sends CloseHandle ("¥File[0]") function that is an instruction to close the File[0], to the file system driver. In step ST110, the file system driver closes the File[0] and sends a return value to the filer.

In step ST111, the filer sends SetFileAttributes("¥File[0]") function that is a setting instruction of an attribute of the File[0], to the file system driver. In step ST112, the file system driver sets the attribute of the File[0] for the file entry, and sends to the filer that setting of the attribute has been completed in step ST113.

The filer determines that the copy processing of the File[0] has been completed, and starts copy processing of the File[1], and, in step ST121, sends CreateFile("¥File[1]") function that is an instruction to open the File[1] that is the copy destination file, to the file system driver.

In step ST123, the file system driver creates the file entry of the File[1] on the memory as the virtual file entry, and, in step ST124, the file system driver sends to the filer a return value indicating that the File[1] is opened.

Next, from the fact that the File[1] is opened, in step ST125-1, the filer sends WriteFile("¥File[1]") function that is a writing instruction of the data to the copy destination file, to the file system driver.

On the basis of the writing instruction, in step ST126-1a, the file system driver reserves the dummy area of the number of bytes to be written indicated by the WriteFile("¥File[1]") function. In addition, the file system driver controls the proxy file writer on the basis of the writing instruction, and stores the file data of the number of bytes to be written in the buffer for the proxy file in step ST126-1b. In step ST127-1, the file system driver sends to the filer a return value indicating that processing of the writing instruction has been completed.

After that, the writing instruction and processing based on the writing instruction are repeatedly performed, and, in step ST125-j, the filer sends the WriteFile("¥File[0]") function to the file system driver to write the file data of the File[1] to the copy destination file. On the basis of the writing instruction, in step ST126-ja, the file system driver reserves the dummy area of the number of bytes to be written indicated by the WriteFile("¥File[0]") function. In addition, the file system driver controls the proxy file writer on the basis of the writing instruction, and stores the file data of the number of bytes to be written in the buffer for the proxy file in step ST126-jb. In step ST127-j, the file system driver sends to the filer a return value indicating that processing of the writing instruction has been completed.

Here, when the file data stored in the buffer is of the burst recording amount by storing the file data in the buffer for the proxy file, in step ST128, the file system driver controls the proxy file writer and the optical disk drive, and performs burst recording on the optical disc of the burst recording amount of file data stored in the buffer.

The writing instruction and processing based on the writing instruction are repeatedly performed, and, in step ST125-q, the filer sends the WriteFile("¥File[1]") function to the file system driver to write the last file data of the File[1] to the copy destination file.

On the basis of the writing instruction, in step ST126-qa, the file system driver reserves the dummy area of the number of bytes to be written indicated by the WriteFile("¥File[1]") function. In addition, the file system driver controls the proxy file writer on the basis of the writing instruction, and stores the file data of the number of bytes to be written in the buffer for the proxy file in step ST126-qb. In step ST127-q, the file system driver sends to the filer a return value indicating that processing of the writing instruction has been completed.

In step ST129, the filer determines that it is completion of writing of all file data of the File[1], and sends CloseHandle ("¥File[1]") function that is an instruction to close the File[1], to the file system driver. In step ST130, the file system driver closes the File[1] and sends a return value to the filer.

In step ST131, the filer sends SetFileAttributes ("¥File[1]") function that is a setting instruction of an attribute of the File[1], to the file system driver. In step ST132, the file system driver sets the attribute of the File[1] for the file entry, and sends to the filer that setting of the attribute has been completed in step ST133.

The filer determines that the copy processing of the File[1] has been completed, and starts copy processing of the File[2], and, in step ST141, sends CreateFile("¥File[2]") function that is an instruction to open the File[2] that is the copy destination file, to the file system driver.

In step ST143, the file system driver creates the file entry of the File[2] on the memory as the virtual file entry, and, in step ST144, the file system driver sends to the filer a return value indicating that the File[2] is opened.

Next, from the fact that the File[2] is opened, in step ST145-1, the filer sends WriteFile("¥File[2]") function that is a writing instruction of the data to the copy destination file, to the file system driver.

On the basis of the writing instruction, in step ST146-1a, the file system driver reserves the dummy area of the number of bytes to be written indicated by the WriteFile("¥File[2]") function. In addition, the file system driver controls the proxy file writer on the basis of the writing instruction, and stores the file data of the number of bytes to be written in the buffer for the proxy file in step ST146-1b. In step ST147-1, the file system driver sends to the filer a return value indicating that processing of the writing instruction has been completed.

After that, the writing instruction and processing based on the writing instruction are repeatedly performed, and, in step ST145-*r*, the filer sends the WriteFile("¥File[2]") function to the file system driver to write the last file data of the File[2] to the copy destination file.

On the basis of the writing instruction, in step ST146-*ra*, the file system driver reserves the dummy area of the number of bytes to be written indicated by the WriteFile("¥File[2]") function. In addition, the file system driver controls the proxy file writer on the basis of the writing instruction, and stores the file data of the number of bytes to be written in the buffer for the proxy file in step ST146-*rb*. In step ST147-*r*, the file system driver sends to the filer a return value indicating that processing of the writing instruction has been completed.

In step ST149, the filer determines that it is completion of writing of all file data of the File[2], and sends CloseHandle ("¥File[2]") function that is an instruction to close the File[2], to the file system driver. In step ST150, the file system driver closes the File[2] and sends a return value to the filer.

In step ST151, the filer sends SetFileAttributes ("¥File[2]") function that is a setting instruction of an attribute of the File[2], to the file system driver. In step ST152, the file system driver sets the attribute of the File[2] for the file entry, and sends to the filer that setting of the attribute has been completed in step ST153.

The file system driver, when the predetermined time has elapsed in the instruction standby, records the remaining data of the buffer for the proxy file on the optical disc in step ST161.

In step ST162, the file system driver updates file entries of the File[0]-File[3]. The file system driver updates the virtual file entry that does not have actual recording information to the file entry indicating the actual recording information. In addition, in step ST163, the file system driver deletes the file entry of the proxy file. Further, in step ST164, the file system driver records the information of the file entries of the File[0]-File[3] on the optical disc. The file system driver records the file system information including information of the file entries after update of the File[0]-File[3] on the optical disc, and returns to step ST21.

As described above, in a case in which plural files of small size are continuously copied, an optical file system driver generates the proxy file, and sequentially stores the file data in the buffer for the proxy file, and performs burst recording on the optical disc for each burst recording amount. In addition, due to the fact that processing for sequentially storing the file data in the buffer for the proxy file has been completed, copying of the next file is started by the filer. Therefore, even when each file size of the plural files to be continuously copied is, for example, less than the burst recording amount, burst recording can be performed, and copy processing can be performed at high speed. In addition, since the file data recorded on the optical disc is managed on a file-by-file basis with the file system information, attribute change, delete, or change of the file name after recording is possible, and usability equivalent to that of a live file system method is obtained. Further, the file data are connected together and burst recording is performed, so that recording performance equivalent to that of a master method is obtained. Further, also in a case in which a file immediately after recording is read, such as at the time of real-time protection using antivirus software, a decrease of recording transfer rate is not caused when the file data is read from the buffer for the proxy file.

In addition, from the fact that the optical file system driver generates the proxy file, sequentially stores the file data in the buffer for the proxy file, and performs burst recording on the optical disc for each burst recording amount, the processing does not have to be changed by the filer or the like. Therefore, it is possible to increase a speed of continuous recording of the file by only updating the optical file system driver, and, for example, copying performance of a conventional information processing device can be easily improved.

Figure 9:
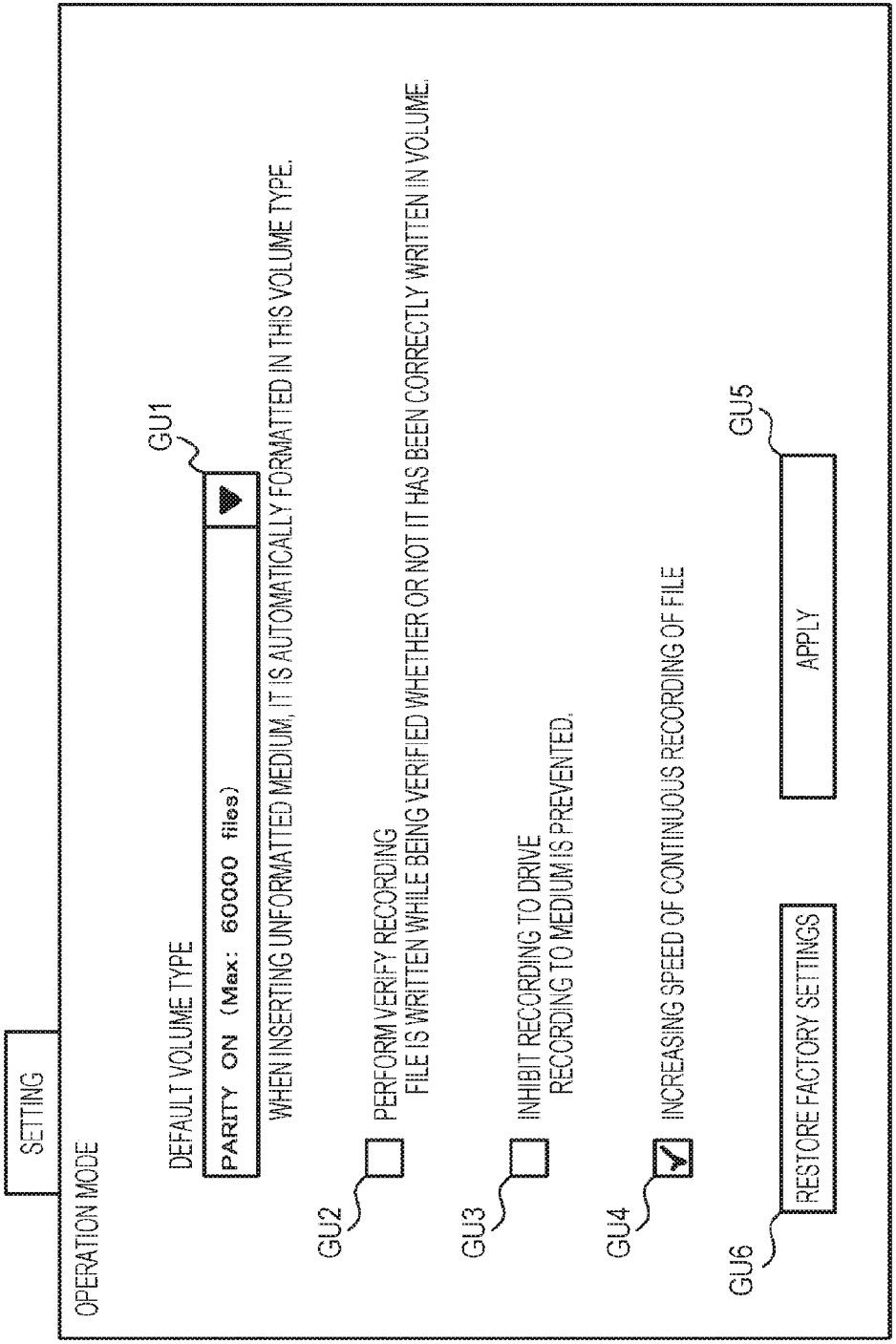
FIG. 9 is a diagram illustrating a setting screen of copy processing.

By the way, the above-described processing for increasing the speed of continuous recording of the file may be performed on the basis of an instruction of a user. FIG. 9 illustrates a setting screen of copy processing in the information processing device. The setting screen is provided with a drop-down button GU1 for setting a volume type. When the drop-down button is operated, a volume type that can be set is displayed as a drop-down list, and a desired volume type is selected from the list.

In addition, the setting screen is provided with a check box GU2 for setting whether or not to perform verify recording, a check box GU3 for setting whether or not to prohibit recording to the drive, and a check box GU4 of whether or not to increase the speed of continuous recording of the file. Further, the setting screen is provided with a button GU5 for applying user settings, and a button GU6 for restoring the settings to factory settings.

Here, in a case in which the check box GU4 of whether or not to increase the speed of continuous recording of the file is checked, the information processing device connects the data of the plural files to be copied together with the optical file system driver, and performs optimal burst recording with the optical disk driver. In addition, in a case in which the check box GU4 is not checked, the information processing device performs copy processing sequentially for each file similarly to the conventional device.

Note that, a recording medium in which plural files are continuously copied is not limited to the optical disc. For example, it may be a case in which a magnetic disk, a tape-like recording medium, or the like is used as the recording medium. In addition, in the above embodiment, a case has been described in which the file of the hard disk drive is copied on the optical disc; however, the file to be copied is not limited to be a file recorded on the hard disk drive, and may be a file recorded on another device, or a file acquired through a network. Alternatively, not limited to copy processing of the file, when the present technology is applied to processing to move the file, moving of the plural files can be completed at higher speed than that of conventional processing. In addition, the information processing device, not limited to a case in which Windows (registered trademark) is used as the operating system, may have a configuration in which another operating system is used such as Mac OS (registered trademark).

Further, in a case in which a series of processing described herein is executed, a program of the file system driver is installed in a memory in a computer to be executed. The program can be recorded in advance in, for example, Read Only Memory (ROM), a Solid State Drive (SSD) or a hard disk as a recording medium. Alternatively, the program can be temporarily or permanently stored (recorded) in a removable recording medium such as a flexible disk, compact disc read only memory (CD-ROM), magneto optical (MO) disk, digital versatile disc (DVD), Blu-ray Disc (registered trademark) (BD), magnetic disk, or semiconductor memory card. Such a removable recording medium can be provided as so-called packaged software.

In addition, the program may be transferred wirelessly or by wire to the computer from a download site through the network such as a local area network (LAN) or the Internet, besides being installed from the removable recording medium to the computer. The computer can receive the program transmitted in that way, and install the program in the recording medium such as a built-in hard disk.

Note that, the advantageous effects described in this specification are merely examples, and the advantageous effects of the present technology are not limited to them and may include additional effects that are not described herein. In addition, the present technology should not be interpreted to be limited to the above described embodiments. The embodiments of the present technology disclose the present technology through examples, and it should be obvious that those skilled in the art can modify or replace those embodiments with other embodiments without departing from the scope of the technology. That is, the claims should be taken into account in understanding the subject matter of the present technique.

In addition, the information processing device of the present technology can have the following configuration.

(1) An information processing device including a recording control unit, wherein the recording control unit regards storing in a buffer of a file to be recorded on a recording medium as recording on the recording medium of the file and generates virtual management information for the file, and performs burst recording on the recording medium of a predetermined amount of data for each time when the predetermined amount of data of the file is stored in the buffer, and updates the virtual management information by using information of the file in the recording medium and records the virtual management information on the recording medium after completion of recording of the file on the recording medium.

(2) The information processing device according to (1), wherein the recording control unit generates management information that does not have information indicating the recording position of the file in the recording medium as the virtual management information, and updates the management information by using information indicating the recording position of the file in the recording medium after completion of recording of the file on the recording medium.

(3) The information processing device according to (1) or (2), wherein the recording control unit, in a case in which there is no writing instruction of the file even after a lapse of a predetermined time, records data on the recording medium, in which the data is of less than the predetermined amount, not recorded on the recording medium, and stored in the buffer.

(4) The information processing device according to any of (1) to (3), wherein the recording control unit generates the virtual management information on a memory, and updates the virtual management information on the memory and records the management information on the recording medium.

(5) The information processing device according to any of (1) to (4), further including a device driver for controlling a device that uses the recording medium, and a file system driver for controlling a file system, wherein
the recording control unit is implemented by the file system driver.

(6) The information processing device according to (5), wherein the recording control unit generates the virtual management information as management information for the file generated in accordance with an instruction from an application that performs file operation, and causes the application to determine completion of recording of the file on the recording medium in accordance with completion of storing in the buffer even before completion of recording on the recording medium of the file.

(7) The information processing device according to any of (1) to (6), wherein the recording control unit selectively performs to the file to be recorded on the recording medium, processing for recording on the recording medium through the buffer, and processing for recording on the recording medium without going through the buffer, on the basis of an instruction of a user.

(8) The information processing device according to any of (1) to (7), wherein recording of the file on the recording medium is performed by using a plurality of channels of recording heads, and
the recording control unit stores the data of the file in the buffer provided for each of the channels.

INDUSTRIAL APPLICABILITY

In an information processing device, information processing method and program of the present technology, storing of a file to be recorded in a recording medium in a buffer is regarded as recording of the file on the recording medium, and virtual management information for the file is generated. In addition, burst recording on the recording medium of a predetermined amount of data is performed for each time when the predetermined amount of data of the file is stored in the buffer. Further, the virtual management information is updated by using information including a recording position of the file in the recording medium and is recorded in the recording medium after completion of recording of the file on the recording medium. For this reason, continuous writing of plural files to the recording medium can be completed at high speed. Therefore, it is suitable for, for example, an archive system for recording multiple files such as of video or audio in an optical disc or the like.

REFERENCE SIGNS LIST

10 Recording system
20 Information processing device
30 Hard disk drive
40 Optical disk drive
45 Optical disc

The invention claimed is:
1. An information processing device, comprising;
one or more processors configured to:
store file data from a first recording medium in a buffer, wherein the file data stored in the buffer is to be recorded on a second recording medium;
generate virtual management information for the file data stored in the buffer;
execute a burst recording operation to write the file data stored in the buffer to the second recording medium when a threshold amount of the file data is stored in the buffer;
update the virtual management information based on the execution of the burst recording operation that records the file data stored in the buffer to the second recording medium and based on information that includes a recording position of the file data from the buffer in the second recording medium;
record the virtual management information on the second recording medium based on the file data that is completely recorded on the second recording medium;

determine when a threshold time period that has been set in advance has elapsed in an instruction standby mode, wherein the instruction standby mode indicates that the one or more processors are waiting for an instruction to write the file data stored in the buffer to the second recording medium; and record the file data stored in the buffer to the second recording medium after a determination that the threshold time has elapsed while the one or more processors are in the instruction standby mode, wherein an amount of the file data stored in the buffer to be recorded to the second recording medium is less than the threshold amount.

2. The information processing device according to claim 1, wherein the one or more processors are further configured to:

generate management information that corresponds to the virtual management information; and update the management information based on the information that indicates the recording position of the file data from the buffer in the second recording medium, and the file data that is completely recorded on the second recording medium.

3. The information processing device according to claim 1, wherein the one or more processors are further configured to:

generate the virtual management information on a memory;

update the virtual management information on the memory; and record the virtual management information on the second recording medium.

4. The information processing device according to claim 1, further comprising:

a device driver configured to control a device, wherein the device driver uses the second recording medium; and a file system driver configured to control a file system, wherein the file system driver is implemented by the one or more processors.

5. The information processing device according to claim 4, wherein the one or more processors are further configured to:

generate the virtual management information as management information for the file data, wherein the virtual management information is generated based on an instruction from an application that executes file operation; and control the application to determine that the file data is completely recorded on the second recording medium based on the file data that is stored in the buffer before the file data is completely recorded on the second recording medium.

6. The information processing device according to claim 1, wherein the one or more processors are further configured to process the file data to record on the second recording medium via the buffer based on a user instruction.

7. The information processing device according to claim 1, wherein the one or more processors are configured to:

record the file data on the second recording medium based on a plurality of channels of recording heads, and store the file data from the first recording medium in the buffer for each of the plurality of channels of recording heads.

8. An information processing method, comprising:

storing, by one or more processors, file data from a first recording medium in a buffer, wherein the file data stored in the buffer is to be recorded on a second recording medium;

generating, by the one or more processors, virtual management information for the file data stored in the buffer;

executing, by the one or more processors, a burst recording operation to write the file data stored in the buffer to the second recording medium when a threshold amount of the file data is stored in the buffer;

updating, by the one or more processors, the virtual management information based on the execution of the burst recording operation that records the file data stored in the buffer to the second recording medium and based on information that includes a recording position of the file data from the buffer in the second recording medium;

recording, by the one or more processors, the virtual management information on the second recording medium based on the file data that is completely recorded on the second recording medium;

determining, by the one or more processors, when a threshold time period that has been set in advance has elapsed in an instruction standby mode, wherein the instruction standby mode indicates that the one or more processors are waiting for an instruction to write the file data stored in the buffer to the second recording medium; and recording, by the one or more processors, the file data stored in the buffer to the second recording medium after determining that the threshold time has elapsed while the one or more processors are in the instruction standby mode, wherein an amount of the file data stored in the buffer to be recorded to the second recording medium is less than the threshold amount.

9. A non-transitory computer-readable medium having stored thereon, computer-executable instructions which when executed by one or more processors of an information processing device, cause the one or more processors of the information processing device to execute operations, the operations comprising:

storing file data from a first recording medium in a buffer, wherein the file data stored in the buffer is recorded on a second recording medium;

generating virtual management information for the file data stored in the buffer;

executing a burst recording operation to write the file data stored in the buffer to the second recording medium when a threshold amount of the file data is stored in the buffer;

updating the virtual management information based on the execution of the burst recording operation that records the file data stored in the buffer to the second recording medium and based on information that includes a recording position of the file data from the buffer in the second recording medium;

recording the virtual management information on the second recording medium based on the file data that is completely recorded on the second recording medium;

determining when a threshold time period that has been set in advance has elapsed in an instruction standby mode, wherein the instruction standby mode indicates that the one or more processors are waiting for an instruction to write the file data stored in the buffer to the second recording medium; and recording the file data stored in the buffer to the second recording medium after determining that the threshold time has elapsed while the one or more processors are in the instruction standby mode, wherein an amount of the file data stored in the buffer to be recorded to the second recording medium is less than the threshold amount.

* * * * *